United States Patent Office 3,131,484
Patented May 5, 1964

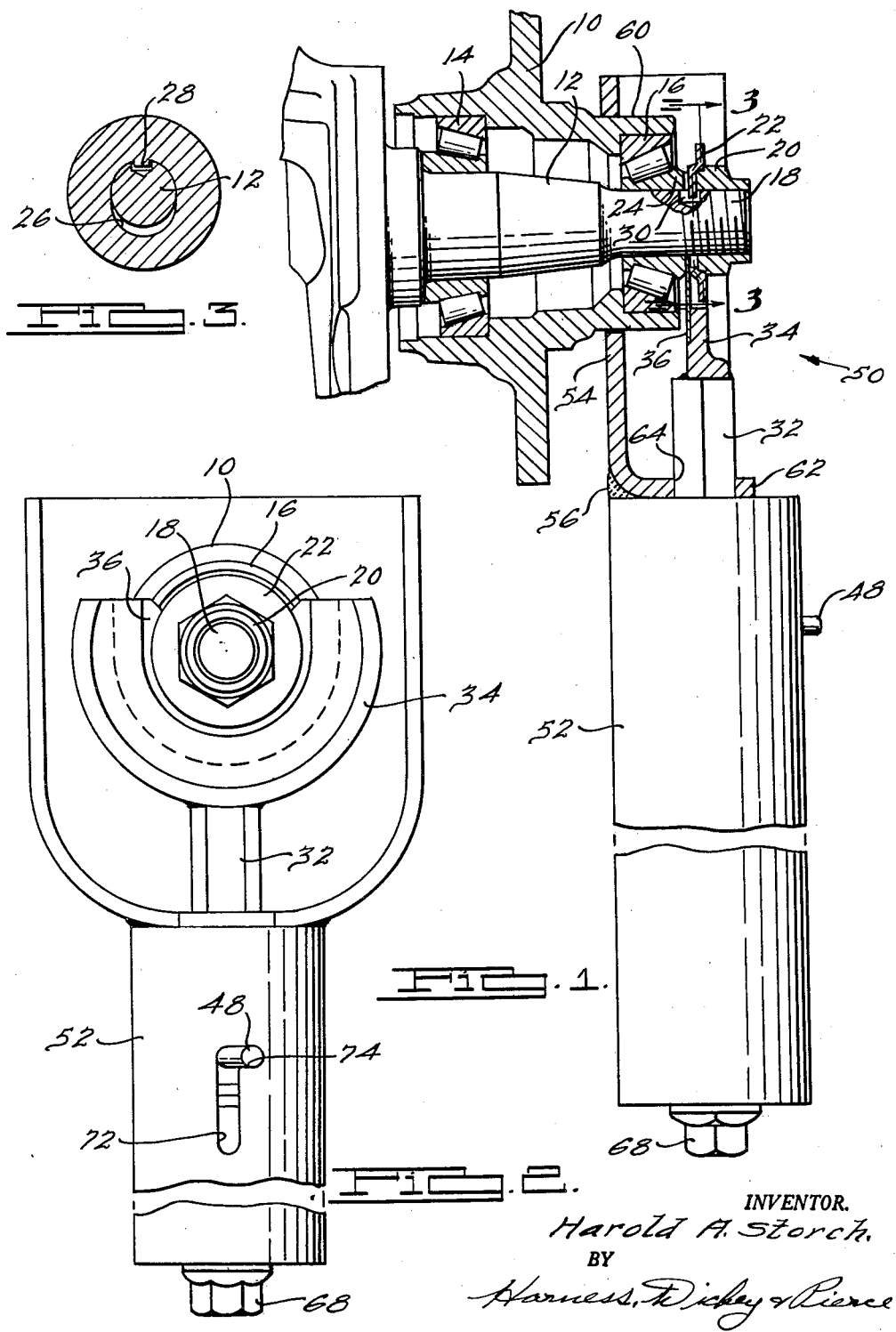

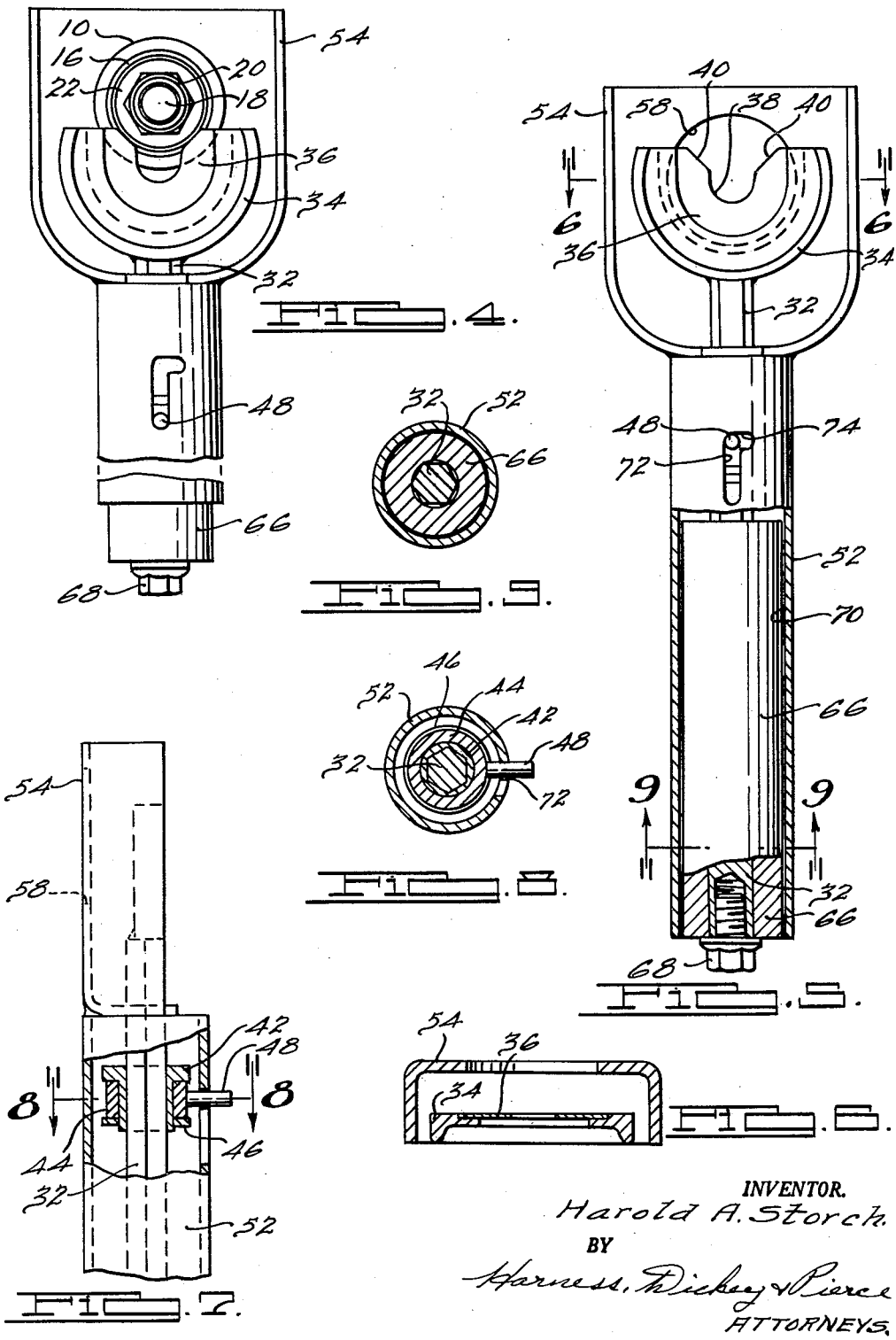

3,131,484
GAUGING FIXTURE FOR WHEEL BEARINGS AND THE LIKE
Harold A. Storch, Birmingham, Mich., assignor to Federal Screw Works, Detroit, Mich., a corporation of Michigan
Filed Jan. 23, 1962, Ser. No. 168,112
5 Claims. (Cl. 33—181)

This invention relates to a gauging fixture for conveniently spacing structural members a predetermined amount while they are being assembled. Such spacing is required in many devices wherein, for example, considerable heat expansion of the parts occurs during normal operation.

One important use of the present fixture is for providing proper clearance between the hub retaining means and the axially outer bearing of a wheel hub and spindle assembly such as is commonly employed on the front end of automotive vehicles and on trailers. The retaining means for the hub usually comprises a washer and spindle nut. It is important in these assemblies that the roller or ball bearings thereof are not subjected to any severe thrust longitudinally of the spindle since they are not primarily thrust bearings and would be jammed thereby. In the normal operation of these vehicles, however, the bearings heat up sufficiently to cause them to expand and it is the clearance between the outer bearing and the washer which takes up this expansion and prevents jamming of the bearings.

According to previous practice in making these assemblies, the wheel spindle nut is threaded onto the spindle and tightened to a predetermined torque. It is then backed off a fraction of a turn. This has proven to possess great inaccuracies in establishing the small clearances required. For example, many wheel bearing specifications call for a clearance of between two and nine thousandths of an inch. While a feeler or thickness gauge could be used, a hand-held thickness gauge is not too convenient to use with accuracy and can result in the establishment of different clearances, depending upon the force with which the gauge is extracted from the assembly. Applicant has found that uniform clearance between the outer bearing and washer of these assemblies may readily be achieved by applying the same pull-out force to the gauge in each of the assemblies.

A principal object, therefore, is to provide gauging means for establishing a proper and uniform clearance between like parts of a plurality of like structural assemblies.

Another object is to eliminate the guesswork in establishing a proper and uniform clearance between the axially outer bearing and the washer of a hub and spindle assembly.

Another object is to provide a simple and inexpensive gauging fixture operable to accomplish the above objects without any manual assistance from the mechanic during the removal of the gauge from between the outer bearings and washers.

A further object is to provide thickness gauge means having readily adjustable pull-out force applying means.

It is still another object of the present invention to provide a gauging fixture of the above character which is inexpensive of manufacture, ruggedly constructed, conveniently handled, and reliable in operation.

In a broad sense, applicant accomplishes the above objects by hanging a weight on the gauge frictionally held between the structural members, and then backing off the tightening means until the weight automatically pulls the gauge from between the members. The special structure of applicant's fixture as will hereinafter become evident makes this technique feasible.

Further objects, advantages and novel features of the invention will become apparent from the following description, claims and drawings wherein:

FIGURE 1 is a partially cross-sectional view of the gauging fixture and hub-spindle assembly;
FIG. 2 is a front elevational view of the gauging fixture and hub-spindle assembly;
FIG. 3 is a cross-sectional view of FIG. 1 taken along the line 3—3;
FIG. 4 is a view similar to FIG. 2 with the thickness gauge in its down or extracted position;
FIG. 5 is a front elevational view of the gauging fixture with portions shown in section and with its thickness gauge in its operative or up position;
FIG. 6 is a cross-sectional view of FIG. 5 taken along the line 6—6 thereof;
FIG. 7 is a partially cross-sectional view of FIG. 5 showing the releasing mechanism;
FIG. 8 is a cross-sectional view of FIG. 7 taken along the line 8—8 thereof; and
FIG. 9 is a cross-sectional view of FIG. 5 taken along the line 9—9 thereof.

Referring to the drawings, a wheel hub 10 is rotatably carried on a spindle 12, in a conventional manner, by means of inner and outer tapered roller bearings 14 and 16, the inner races of which are relatively loosely slidably mounted on the spindle. The spindle is threaded on its outer end at 18 and receives a spindle nut 20 which is initially deformed so that it tends to frictionally lock itself to the spindle as it is threaded thereon. A washer 22 is positioned intermediate the nut 20 and the inner race 24 of the bearing 16. This washer, as shown in FIG. 3, has an oblong aperture 26 and a projection 28 extending thereinto. When the washer is slipped on over the spindle, the projection drops down into a recess 30 therein as shown in FIGS. 1 and 3, and thereafter prevents the washer from rotating on the spindle. Other types of non-rotating washers may be employed and their main function is to prevent the rotating inner race of the outer wheel bearing from exerting sufficient torque on nut 20 to overly tighten it and jam the bearings, or spin it completely off of the spindle with a subsequent loss of the wheel. Such a torque might occur for example where the inner and outer races frictionally seize with the rollers or balls to form a unitary rotating structure.

The gauging fixture comprises a shank 32 welded to and arcuate support 34 which in turn is spot welded or brazed to the thickness gauge 36. This gauge has a groove 38 therein of substantially the same radius as the spindle so as to readily receive the spindle and extend about halfway therearound. The groove edges are beveled at 40 to facilitate locating the gauge on the spindle. Shank 32 is fixedly secured to a bushing 42 having a sleeve 44 rotatably mounted thereon and retained in position by a disc 46 fixed to the bottom of the bushing 42. A lever 48 is secured to sleeve 44 and when actuated rotates the sleeve about the bushing 42 and shaft 32.

A support cooperates with shaft 32 and lever 48 to allow proper and convenient operation of the thickness gauge 36 and comprises a handle 52 and a hanger 54 welded together at 56. The handle 52 is of hollow tubular form and serves the additional function of having the hereinafter described force applying means. Hanger 54 is formed with an aperture 58 of sufficient size to slidably receive the annular portion 60 of the wheel hub. The base portion 62 of hanger 54 is formed with an aperture 64 of hexagonal shape for slidably receiving the hexagonal shank 32 while preventing rotation thereof. Shank 32 extends through force applying means in the form of a weight member 66 which is supported by a flanged bolt 68 threadedly received in the end of shank 32. Member 66 may be constructed of different lengths and/or material to vary the thickness gauge pull-out force and is readily slidable within the bore 70 of the handle 52. Handle 52 is formed with a slot having a vertical portion 72 and a lateral portion or shoulder 74 which are adapted to slidably receive the lever 48 which extends outwardly from the handle for actuation as described below. The lever 48 and the shoulder 74 form cooperating retaining means for holding the gauge 36 in a position adjacent the nut 20, said retaining means being releasable to permit the weight 66 to apply its force to the gauge 36. The weight 66 conforms in outer peripheral shape to the interior of the handle 52 and is smoothly slidable therein. Thus, when the lever 48 is manually moved from the slot shoulder portion 74 to the vertical portion 72, the weight 66 is free to fall a limited distance.

In assembling the wheel hub and bearings on the spindle, the hub and bearings are slid onto the spindle so that the outer races of the bearings frictionally engage the hub while the inner races of the bearings frictionally but slidably engage the spindle. The washer 22 is then slid into the spindle until projection 28 drops into the recess 30. Hanger 54 of the support is then hung on portion 60 of the hub at the position shown in FIG. 1 and shank 32 is moved from its down position of FIG. 4 to its up position of FIG. 1 wherein the gauge 36 is interposed between the inner race 24 of the bearing 16 and the washer 22. The lever 48 is then rotated from the position shown in FIG. 5 to the position shown in FIG. 2 and is then released. The bottom wall of slot portion 74 thereafter prevents shank 32 and the weight 66 carried thereby from dropping down in the handle 52. The nut 20 is then rotated onto the spindle 18 and is brought up fairly tightly against the washer 22 which squeezes the gauge 36 against the inner race 24 of bearing 16. It is noted that the washer 22 being non-rotative on the spindle will not tend to frictionally deform the gauge 36 which might otherwise occur due to the rotational force imparted on the washer by the nut 20. With the nut so tightened and the gauge 36 so compressed, lever 48 is rotated out of the slot portion 74 to the position shown in FIG. 5. Nut 20 is then backed off slowly and carefully until gauge 36 is pulled from between the inner race 24 and the washer 22 primarily by the weight of member 66. Sufficient clearance is now available to take up heat expansion of the bearings and prevent jamming or other damage thereto and it is readily apparent that the clearance will be uniform in all of the hub-spindle assemblies due to the fact that the same extracting force shall be applied to the gauge in each case. This down position of the gauge is shown in FIG. 4 wherein it is seen that the hanger 54 may then be removed from the hub. It is noted that when gauge 36 is made of such material as spring steel, its natural resiliency will bring it back to its original thickness so that it may be repeatedly used.

It is not applicant's intention to limit his invention to the weight form 66 of force means illustrated, but rather to encompass any of the well known means capable of developing and applying predetermined extracting forces to the gauge 36. For example, a compressible spring of predetermined strength could be installed between the top of bushing 42 and the underside of base portion 62 of hanger 54 to apply the proper extracting force to gauge 36. It will also be apparent that the gauging fixture of the present invention could be used with any spindle assembly utilizing an anti-friction bearing and a non-rotary washer and nut, and is not limited in the uses to the particular spindle assembly illustrated herein.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A device for providing clearance between members, comprising thickness gauge means adapted to be interposed between the members, force means engaging said gauge means for exerting a predetermined force thereon tending to extract the same from between the members, support means adapted to be removably mounted on means extrinsic to said gauge means, and means for engaging said force means with said support means to prevent said force means from exerting said predetermined force on said gauge means.

2. A device for providing clearance between members, comprising thickness gauge means adapted to be interposed between the members, force means engaging said gauge means for exerting a predetermined force thereon tending to extract the same from between the members, support means adapted to be removably mounted on means extrinsic to said gauge means, and means on said support means for engaging said force means at a certain position of said gauge means to prevent said force means from exerting said predetermined force on said gauge means.

3. A device for providing clearance between members, comprising thickness gauge means adapted to be interposed between the members, force means having lever means thereon, said force means engaging said gauge means for exerting a predetermined force thereon tending to extract the same from between the members, support means adapted to be removably mounted on means extrinsic to said gauge means, and shoulder means on said support means for engaging said lever means on said force means at a certain position of said gauge means to prevent said force means from exerting said predetermined force on said gauge means.

4. A gauging fixture for providing clearance between the outer bearing and the retaining means of a wheel hub and spindle assembly, comprising support means adapted to be removably mounted on a portion of the wheel hub, thickness gauge means slidably mounted on said support means for movement toward and away from the spindle, force means engaging said gauge means and adapted to urge the same away from the spindle with a predetermined force, and cooperating retaining means on said force means and support means releasable to allow said predetermined force to be applied to said gauge means when desired.

5. A gauging fixture for providing clearance between the anti-friction bearing and the retaining means of a wheel hub and spindle assembly, including a hanger adapted to be positioned over the spindle, a hollow elongated handle connected to said hanger, a shank extending longitudinally within said handle, a thickness gauge connected to said shank, a weight on said shank slidable in said handle, and releasable retaining means for holding said thickness gauge, shank and weight in a given position relative to said hanger and handle.

References Cited in the file of this patent
UNITED STATES PATENTS

| | | |
|---|---|---|
| 1,935,131 | Schotthoefer | Nov. 14, 1933 |
| 2,854,756 | Aller | Oct. 7, 1958 |